(12) United States Patent
Ogawa et al.

(10) Patent No.: US 10,917,528 B2
(45) Date of Patent: Feb. 9, 2021

(54) IMAGE READING DEVICE AND IMAGE FORMING APPARATUS INCLUDING THE SAME THAT SEQUENTIALLY TRANSPORT AND READ PLURALITY OF DOCUMENTS ONE BY ONE

(71) Applicant: SHARP KABUSHIKI KAISHA, Sakai (JP)

(72) Inventors: Kazuma Ogawa, Sakai (JP); Hideyuki Hiro, Sakai (JP); Masahiro Kawano, Sakai (JP); Masayuki Furusawa, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 16/677,122

(22) Filed: Nov. 7, 2019

(65) Prior Publication Data
US 2020/0153977 A1    May 14, 2020

(30) Foreign Application Priority Data
Nov. 12, 2018   (JP) ................................ 2018-212044

(51) Int. Cl.
  *G06K 7/00*   (2006.01)
  *H04N 1/00*   (2006.01)
  *G06F 3/12*   (2006.01)
  *H04N 1/12*   (2006.01)

(52) U.S. Cl.
  CPC ....... *H04N 1/00037* (2013.01); *G06F 3/1256* (2013.01); *H04N 1/00074* (2013.01); *H04N 1/00697* (2013.01); *H04N 1/1215* (2013.01)

(58) Field of Classification Search
  CPC .............. G06F 3/1256; H04N 1/00074; H04N 1/00697; H04N 1/00567; H04N 1/0062; H04N 1/00631
  USPC ........ 358/1.12, 1.13, 403; 399/16; 271/3.17, 271/3.09
  See application file for complete search history.

(56) References Cited

U.S. PATENT DOCUMENTS

2012/0274996 A1\* 11/2012 Sakuma ............. H04N 1/00631
                                                      358/498
2016/0037002 A1\* 2/2016 Ichikawa ........... H04N 1/00771
                                                      358/1.15

FOREIGN PATENT DOCUMENTS

| JP | 2001-312106 A | 11/2001 |
|----|---------------|---------|
| JP | 2012-231305 A | 11/2012 |

\* cited by examiner

*Primary Examiner* — Jamares Q Washington
(74) *Attorney, Agent, or Firm* — ScienBiziP, P.C.

(57) ABSTRACT

Provided is an image reading device includes a document transport device that sequentially transports a plurality of documents one by one, and the image reading device sequentially reads the plurality of documents transported by the document transport device one by one. The image reading device includes a document discharge tray, a document discharge detector that detects whether or not a document of the plurality of documents is discharged to the document discharge tray, a notifier that notifies that the document of the plurality of documents discharged to the document discharge tray is forgotten to take, and a controller that activates the notifier if it is determined that a last document among the plurality of documents is read and the document discharge detector detects that the document of the plurality of documents is discharged to the document discharge tray.

13 Claims, 15 Drawing Sheets

IMAGE READING DEVICE AND IMAGE FORMING APPARATUS INCLUDING THE SAME THAT SEQUENTIALLY TRANSPORT AND READ PLURALITY OF DOCUMENTS ONE BY ONE

BACKGROUND OF THE INVENTION

Field of the Invention

The present invention relates to an image reading device and an image forming apparatus such as a copying machine, a multifunction machine, a printer device, and a facsimile device, including the image reading device.

Description of the Background Art

An image reading device including a document transport device that sequentially transports a plurality of documents one by one sequentially reads the plurality of documents transported by the document transport device one by one. Conventionally, such an image reading device does not recognize whether or not a last document of the plurality of documents is read, which causes the following inconvenience.

That is, an example of a conventional image reading device includes an image reading device including a document discharge tray, a document discharge detector that detects whether or not a document is discharged to the document discharge tray, and a notifier (for example, a light-emitting element such as an LED or a display panel) that notifies a document discharged to the document discharge tray is forgotten to take.

In such an image reading device, if a document is detected by the document discharge detector (if a document remains on the document discharge tray) after an image forming operation is completed, a notification (for example, light emission of a light-emitting element or display of a display panel) is performed by the notifier. Further, if the document discharge detector no longer detects the document (if the document on the document discharge tray is removed), the notification by the notifier is canceled (for example, the light emission of the light-emitting element is canceled or the display of the display panel is canceled) (see, for example, Japanese Unexamined Patent Application Publication No. 2001-312106).

However, in conventional image reading devices, the notification by the notifier is performed immediately after a job is executed (first document), and thus, there is a problem in that a user is kept being notified, that is, the user cannot feel any change, until the user actually removes the document from the document discharge tray (job completion), as a result of which it is difficult for the user to notice the notification.

With respect to this point, Japanese Unexamined Patent Application Publication No. 2012-231305 discloses a technique in which a notifier performs notification (a lamp emits light) when a plurality of documents set on a document set tray on which to set a document before being read, are transported to a reader and no left documents are detected on the document set tray.

However, since a state after a last document among the plurality of documents is read is not recognized, it is not possible to notify, by the notifier, a document of the plurality of documents discharged to the document discharge tray is forgotten to take in a state where it is surely recognized that the last document is read.

Therefore, an object of the present invention is to provide an image reading device capable of notifying, by a notifier, a document of a plurality of documents discharged to the document discharge tray is forgotten to take in a state where it is surely recognized that a last document among the plurality of documents is read, and an image forming apparatus including the image reading device.

SUMMARY OF THE INVENTION

To solve the problems described above, the present invention provides the following image reading device and image forming apparatus.

1. Image Reading Device

An image reading device according to the present invention including a document transport device that sequentially transports a plurality of documents one by one, the image reading device sequentially reading the plurality of the documents transported by the document transport device one by one, the image reading device includes a document discharge tray, a document discharge detector that detects whether or not a document of the plurality of documents is discharged to the document discharge tray, a notifier that notifies that the document of the plurality of documents discharged to the document discharge tray is forgotten to take, and a controller that activates the notifier if it is determined that a last document among the plurality of documents is read and the document discharge detector detects that the document of the plurality of documents is discharged to the document discharge tray.

2. Image Forming Apparatus

An image forming apparatus according to the present invention includes the image reading device according to the present invention.

According to the present invention, in a state where it is surely recognized that a last document among the plurality of documents is read, it is possible to notify that a document is forgotten to take.

DESCRIPTION OF THE PREFERRED EMBODIMENTS

Figure 1:
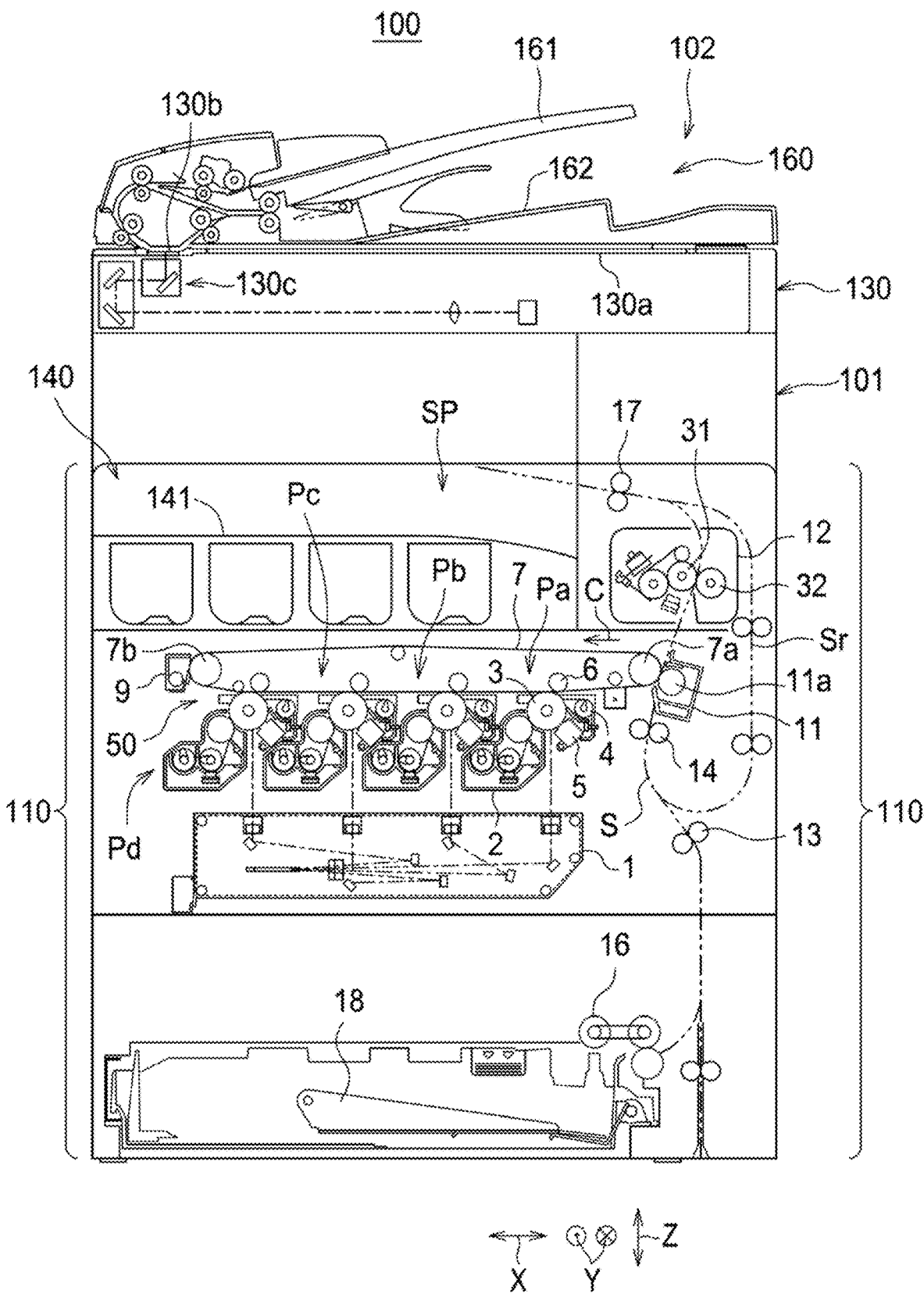
FIG. 1 is a front view transparently illustrating a schematic configuration of an image forming apparatus according to an embodiment of the present invention.

Below, an embodiment according to the present invention will be described with reference to the drawings. In the following description, same parts are denoted by the same reference numerals. The names and functions of the same parts are also the same. Therefore, detailed description thereof will not be repeated.

Figure 2:
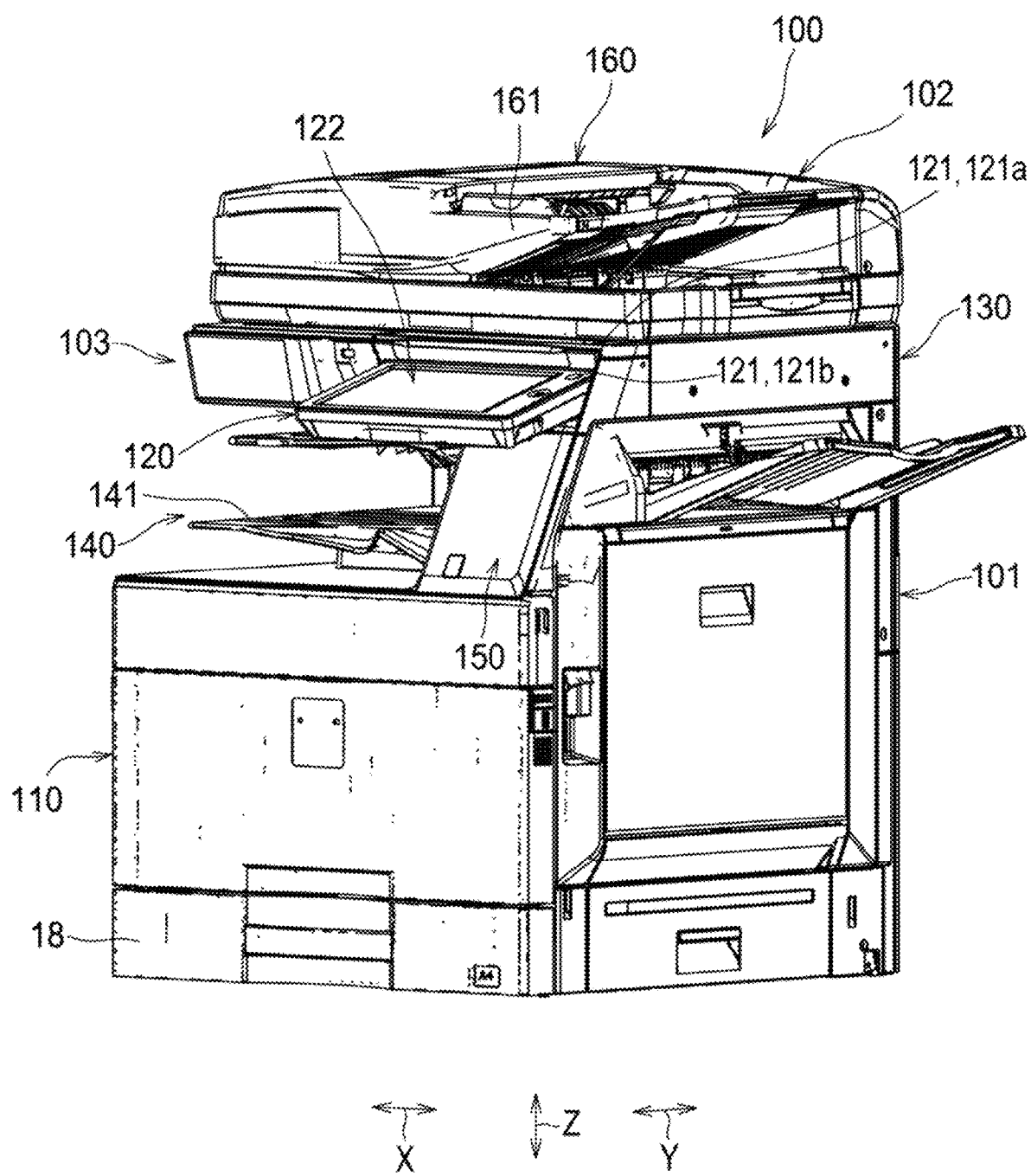
FIG. 2 is a perspective view illustrating an outer appearance of an example of the image forming apparatus according to the present embodiment.
Figure 3:
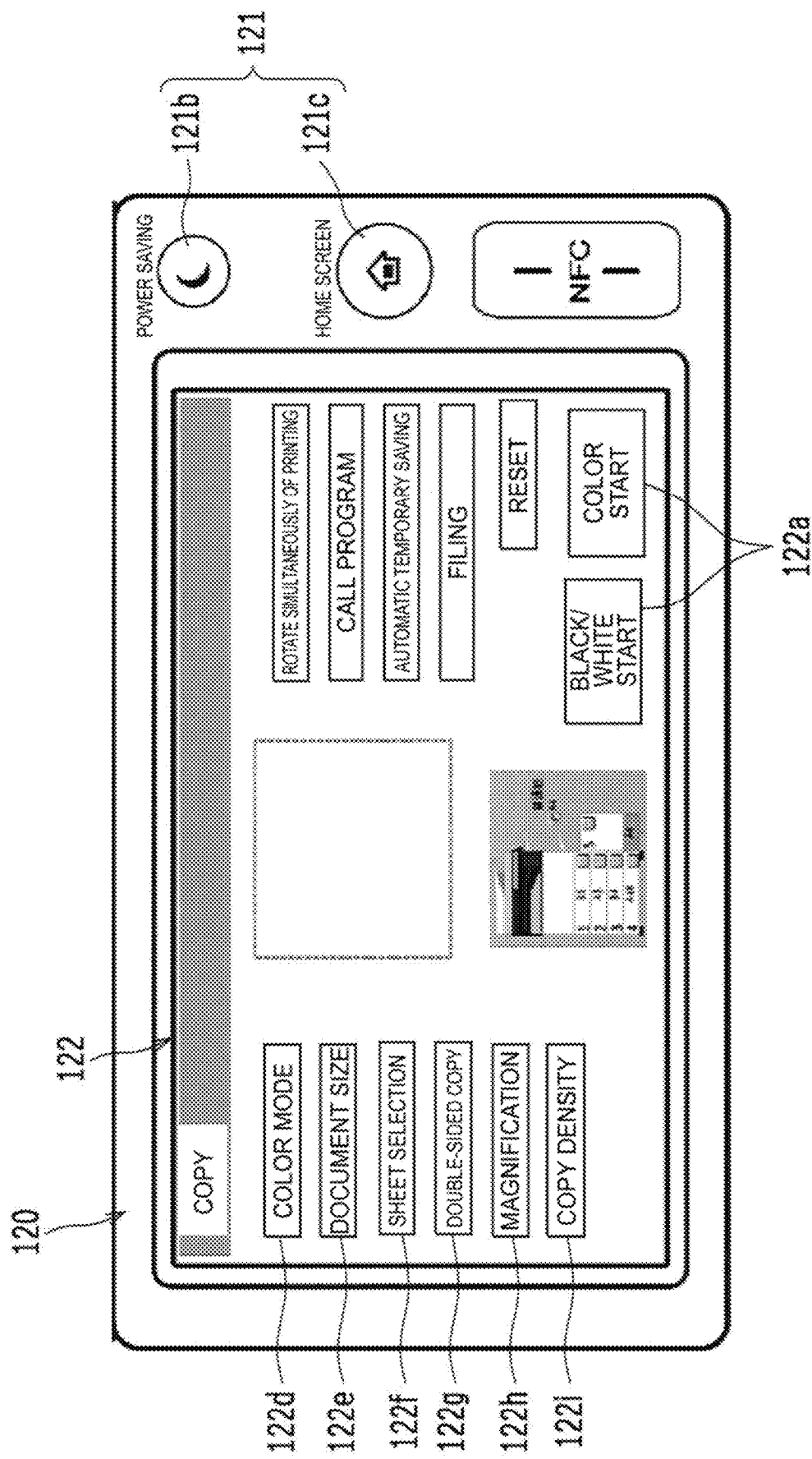
FIG. 3 is a plan view illustrating an operation device in the image forming apparatus illustrated in FIG. 1.
Figure 4:
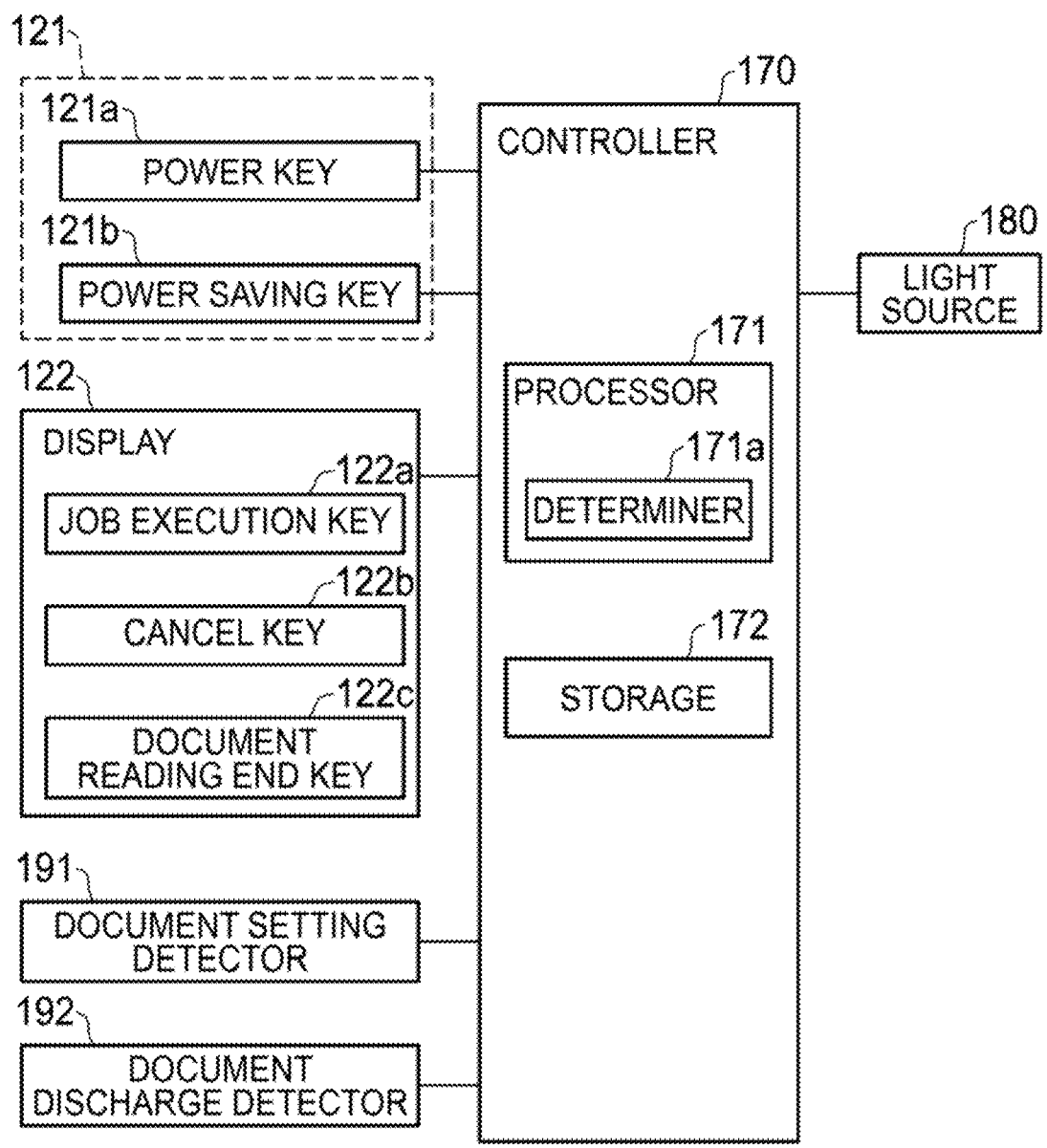
FIG. 4 is a system block diagram of a control system in the image forming apparatus illustrated in FIG. 1.

FIG. 1 is a front view transparently illustrating a schematic configuration of an image forming apparatus 100 according to an embodiment of the present invention. FIG. 2 is a perspective view illustrating an outer appearance of an example of the image forming apparatus 100 according to the present embodiment. FIG. 3 is a plan view illustrating an operation device 120 in the image forming apparatus 100 illustrated in FIG. 1. Further, FIG. 4 is a system block diagram of a control system in the image forming apparatus 100 illustrated in FIG. 1. It is noted that, in FIGS. 1 and 2, reference numeral X indicates a lateral direction (left-right direction), reference numeral Y indicates a width direction (front-rear direction), and reference numeral Z indicates a height direction (up-down direction).

The image forming apparatus 100 is a multifunction machine having a copy function, a scanner function, a facsimile function, and a printer function, and transmits an image of a document read by an image reading device 102 to the outside. Further, the image forming apparatus 100 forms an image of a document read by the image reading device 102 or of an image received from the outside on a sheet in color or in a single color.

On the upper side of an image reader 130, a document transport device 160 (automatic document feeder (ADF)) is arranged that is supported to be openable and closable with respect to the image reader 130. The image reading device 102 includes the document transport device 160. The document transport device 160 sequentially transports, one by one, a plurality of documents. The image reading device 102 reads a document among the plurality of documents transported, one by one, by the document transport device 160. The image reading device 102 includes a document platen 130a on which to set a document, and a set-document reading function that reads a document set on the document platen 130a. In the image forming apparatus 100, if the document transport device 160 is opened, the document platen 130a at an upper side of the image reader 130 is opened, and thus, the document can be set manually. Further, the document transport device 160 includes a document set tray 161 on which to set a document and a document discharge tray 162 that stacks a document discharged to the outside. The image reading device 102 has a transported-document reading function that reads a document transported by the document transport device 160. The document transport device 160 transports a document set on the document set tray 161 onto a document reader 130b in the image reader 130. The image reader 130 reads the document set on the document platen 130a by a scanning optical system 130c scanning the document or reads the document transported by the document transport device 160 to generate image data.

The image forming apparatus 100 includes an optical scanning device 1, a developing device 2, a photoreceptor drum 3, a drum cleaning device 4, a charger 5, an intermediate transfer belt 7, a fixing device 12, a sheet transport path S, a paper feed cassette 18, and an in-body discharge tray 141.

In the image forming apparatus 100, image data corresponding to a color image using each color of black (K), cyan (C), magenta (M), and yellow (Y), or a monochrome image using a single color (for example, black) is handled. In an image transfer 50 of the image forming apparatus 100, the developing device 2 includes four developing devices 2, the photoreceptor drum 3 includes four photoreceptor drums 3, the drum cleaning device 4 includes four drum cleaning devices 4, and the charger 5 includes four chargers 5 to form four types of toner images, and each of the developing devices 2, the photoreceptor drums 3, the drum cleaning devices 4, and the chargers 5 is associated with black, cyan, magenta, and yellow to configure four image stations Pa, Pb, Pc, and Pd.

The optical scanning device 1 exposes a surface of the photoreceptor drum 3 to form an electrostatic latent image. The developing device 2 develops the electrostatic latent image on the surface of the photoreceptor drum 3 to form a toner image on the surface of the photoreceptor drum 3. The drum cleaning device 4 removes and collects residual toner from the surface of the photoreceptor drum 3. The charger 5 uniformly charges the surface of the photoreceptor drum 3 to a predetermined potential. By the above-described series of operations, a toner image of each of the colors is formed on the surface of each of the photoreceptor drums 3.

An intermediate transfer roller 6 is arranged on an upper side of the photoreceptor drum 3 via the intermediate transfer belt 7. The intermediate transfer belt 7 is stretched around a transfer driving roller 7a and a transfer driven roller 7b, and moves in circles in a direction of an arrow C. In the image forming apparatus 100, residual toner is removed and collected by a belt cleaning device 9, and a toner image of each of the colors formed on the surface of each of the photoreceptor drums 3 is sequentially transferred and superposed to form a color toner image on the surface of the intermediate transfer belt 7.

A nip area is formed between a transfer roller 11a of a secondary transfer 11 and the intermediate transfer belt 7, and a sheet transported through the sheet transport path S is sandwiched and transported in the nip area. When the sheet passes through the nip area, the toner image on the surface of the intermediate transfer belt 7 is transferred and transported to the fixing device 12.

The fixing device 12 includes a fixing roller 31 and a pressure roller 32 that rotate with a sheet sandwiched therebetween. The fixing device 12 sandwiches, between the fixing roller 31 and the pressure roller 32, the sheet onto which a toner image is transferred and heats and presses the sheet to fix the toner image on the sheet.

The paper feed cassette 18 is a cassette that stacks a sheet used for image formation, and is arranged below the optical scanning device 1. The sheet is drawn out from the paper feed cassette 18 by a sheet pick-up roller 16 and is transported on the sheet transport path S. The sheet transported on the sheet transport path S is transported to a discharge roller 17 via the secondary transfer 11 and the fixing device 12 and is discharged to the in-body discharge tray 141. A transport roller 13, a registration roller 14, and the discharge roller 17 are arranged on the sheet transport path S. The transport roller 13 prompts transport of the sheet. The registration roller 14 temporarily stops the sheet and aligns the front ends of the sheet. The registration roller 14 transports the temporarily stopped sheet at a timing synchronized with the color toner image on the intermediate transfer belt 7. The color toner image on the intermediate transfer belt 7 is transferred to the sheet in the nip area between the intermediate transfer belt 7 and the transfer roller 11*a*.

It is noted that, in FIG. 1, one paper feed cassette 18 is provided, however, not limited to this. A plurality of paper feed cassettes 18 may be provided, and different types of sheets may be stacked in each of the paper feed cassettes 18.

Further, if the image forming apparatus 100 forms an image not only on a front side of the sheet, but also on a back side, the sheet is transported from the discharge roller 17 in a reverse direction on a reverse sheet path Sr. The image forming apparatus 100 reverses the front and back of the sheet transported in the reverse direction and guides the sheet again to the registration roller 14. Further, the image forming apparatus 100 forms, in a manner similar to the front side, an image on the back side of the sheet guided to the registration roller 14, and carries out the sheet to the in-body discharge tray 141.

The image forming apparatus 100 includes an image former 110, the operation device 120 (operation panel), the image reader 130, a discharger 140, a supporter 150, the document transport device 160, and a controller 170. The discharger 140 discharges a sheet between the image former 110 and the image reader 130. The supporter 150 supports the image reader 130 so to provide a space SP between the image former 110 and the image reader 130.

An image forming apparatus main body 101 has a substantially rectangular parallelepiped shape. The image reader 130 is provided on a top surface of the image forming apparatus main body 101, and the document transport device 160 is attached on top of the image reader 130. Further, the operation device 120 is adjacent to the image reader 130 and is provided on a front surface side of the image reader 130 provided on the top surface of the image forming apparatus main body 101. Here, the front surface side is an operation side on which an operator operates the operation device 120. The operation device 120 is provided at an end part (specifically, a right-side end part) of the image reader 130 in the lateral direction X. The operation device 120 is configured to tilt in the height direction Z with respect to the image reader 130.

Various Types of Keys

The operation device 120 is provided with various types of keys 121 to be operated by an operator and a display 122 (liquid crystal display device). The various types of keys 121 and the display 122 are electrically connected to the controller 170. The various types of keys 121 (hardware keys) include a power key 121*a* and a power saving key 121*b*. The power key 121*a* is a key to turn on/off the power supply to the image forming apparatus 100 in a state where a mechanical main power switch (not illustrated) is on. Specifically, the power key 121*a* is an electrical sub power switch, and if the power key 121*a* is off, no function except for a function of a certain constituent element, such as a facsimile function by a telephone line or an Internet facsimile function, is active. The power saving key 121*b* is a key to be turned on/off if the image forming apparatus 100 is in a standby state. If the power saving key 121*b* is turned on, an energy-saving mode is activated in which power consumption of the image forming apparatus 100 in the standby state is reduced, and if the power saving key 121*b* is turned off, the energy-saving mode is canceled.

Further, on a display screen of the display 122, a job execution key 122*a* (software key) (see FIGS. 3 and 4) to execute a job (copy job, scan job, facsimile job) is displayed to allow for an input operation. Here, the "job" refers to a series of operations from when a user performs an image forming operation intended by the user until completion of the image forming operation. Further, on the display screen of the display 122, a cancel key 122*b* (see FIG. 4) to stop reading a document during reading the document, and a document reading end key 122*c* (see FIG. 4) to indicate a last reading operation of a plurality of reading operations by a large-quantity-document reading function, may be displayed.

It is noted that, in the operation device 120 illustrated in FIG. 3, reference numeral 121*c* denotes a hardware key, and denotes a home screen key to transition to a home screen (initial screen). Reference numerals 122*d* to 122*i* denote software keys, namely a color mode key to select a color mode, a document size key to select a document size, a sheet selection key to select a sheet size, a double-sided copy key to select a double-sided copy, a magnification selection key to select magnification, and a copy density key to select a copy density.

Operation Processor

In the image forming apparatus 100, an operation processor 103 includes a front surface of the image reader 130, a front surface of the supporter 150, and the operation device 120.

Controller

The controller 170 includes a processor 171 including a microcomputer such as a CPU, and a storage 172 including a nonvolatile memory such as a ROM and a volatile memory such as a RAM. The controller 170 controls an activation of various types of constituent elements by loading onto the RAM of the storage 172 and executing, a control program stored in advance in the ROM of the storage 172, by the processor 171.

The image forming apparatus 100 further includes a notifier (in this example, a light source 180). The light source 180 is electrically connected to an output system of the controller 170 and can be turned on or off by an operation signal from the controller 170.

Notification of Forgetting to Take Document

The controller 170 includes a determiner 171*a* that determines if a last document among a plurality of documents is read.

According to the present embodiment, the determiner 171*a* determines that a last document among the plurality of documents is read (completion of document reading), and thus, it is possible to notify the user, by the notifier (light source 180), a document of the plurality of documents discharged to the document discharge tray is forgotten to take in a state where it is surely recognized that the last document is read.

Figure 5:
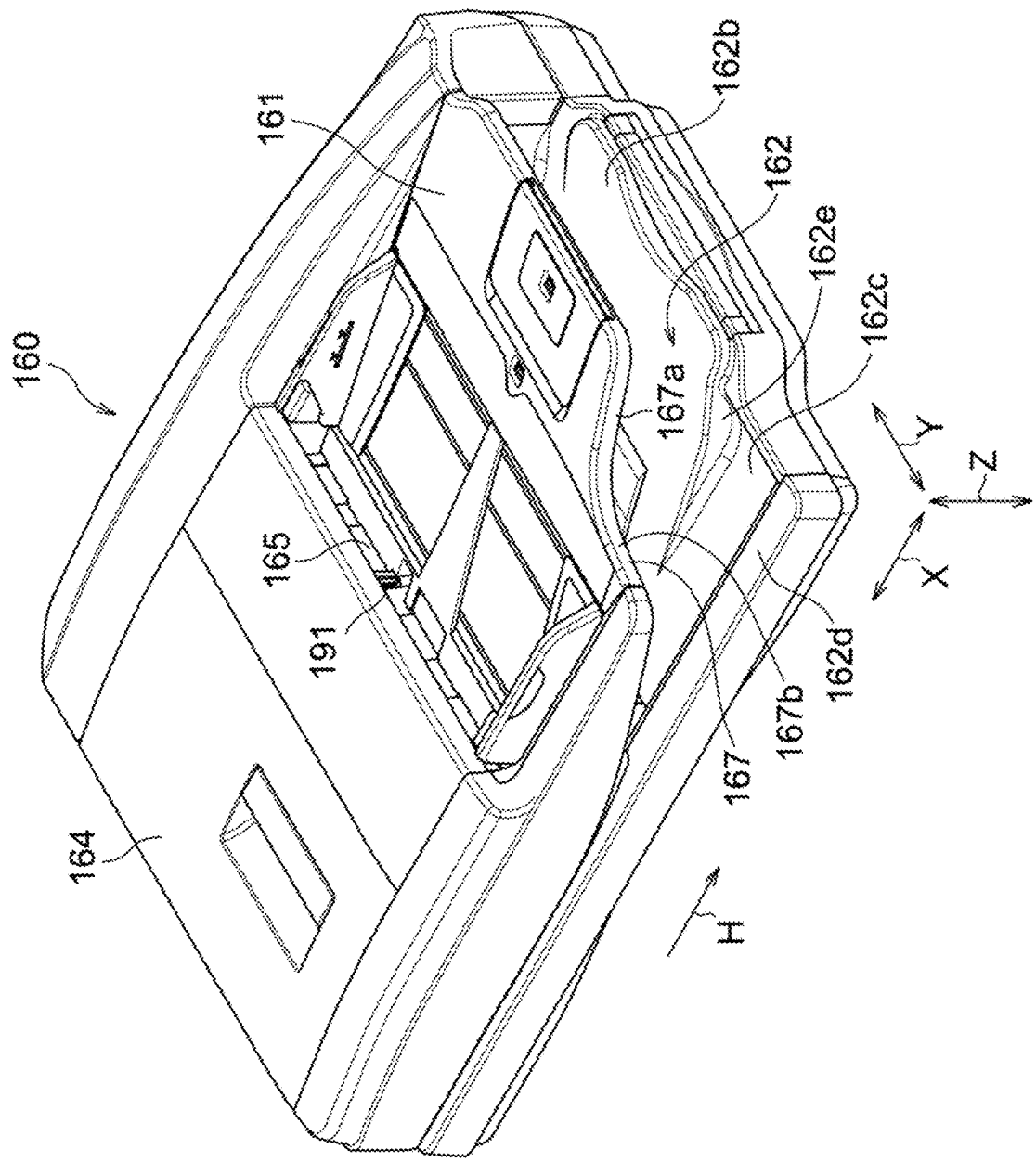
FIG. 5 is a perspective view illustrating a document transport device illustrated in FIG. 1.
Figure 6:
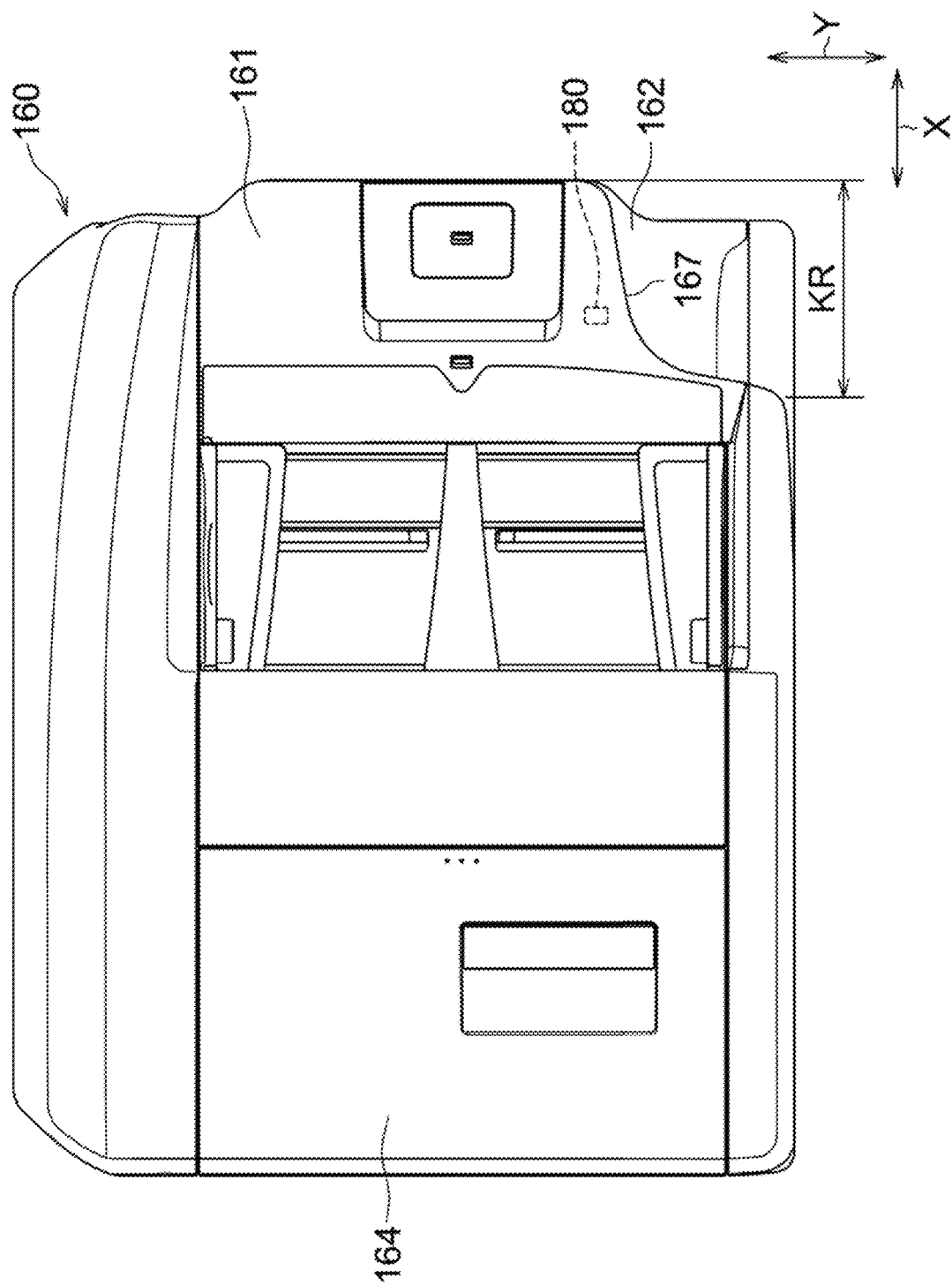
FIG. 6 is a plan view of the document transport device illustrated in FIG. 1.
Figure 7:
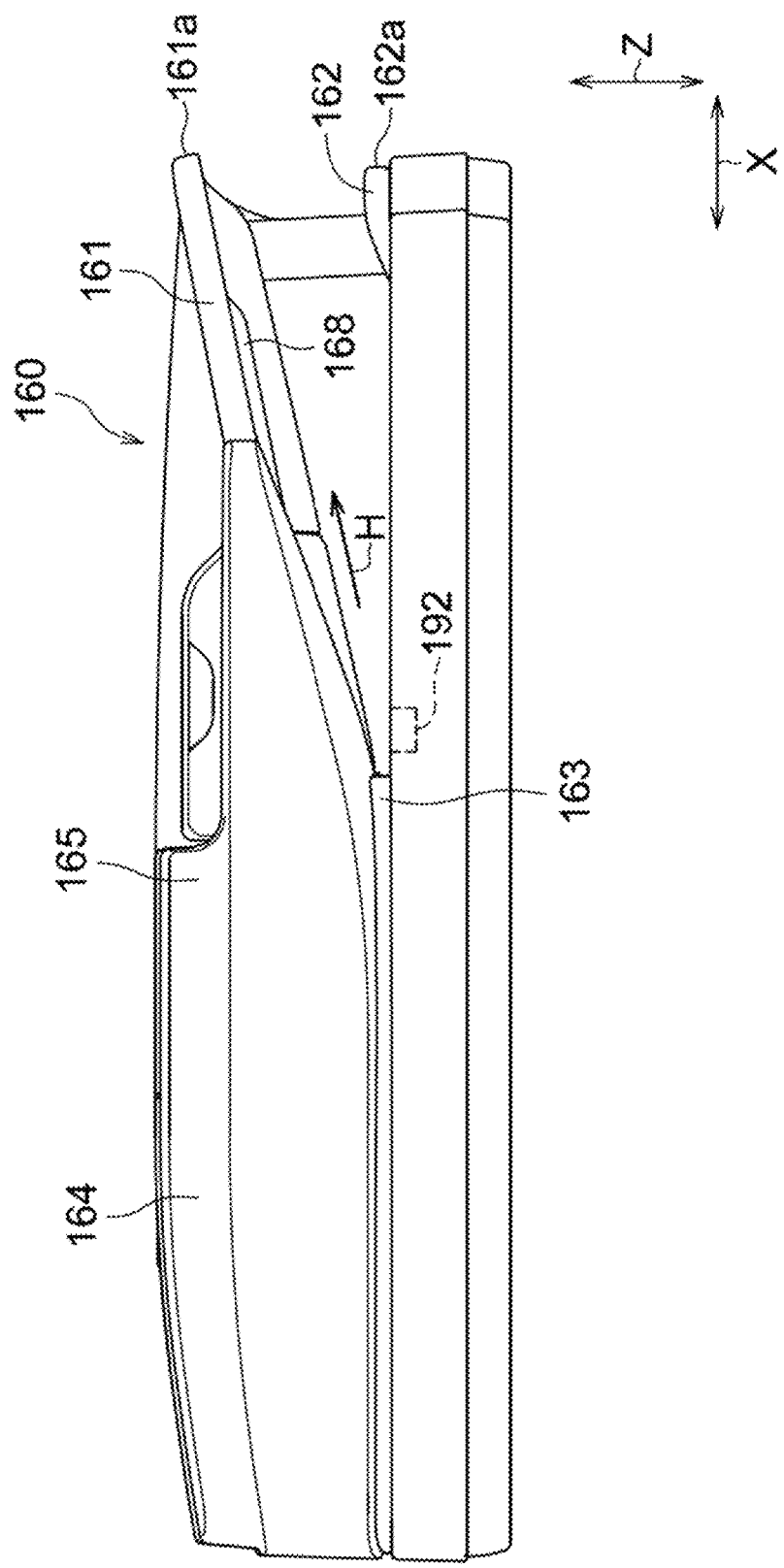
FIG. 7 is a front view of the document transport device illustrated in FIG. 1.
Figure 8:
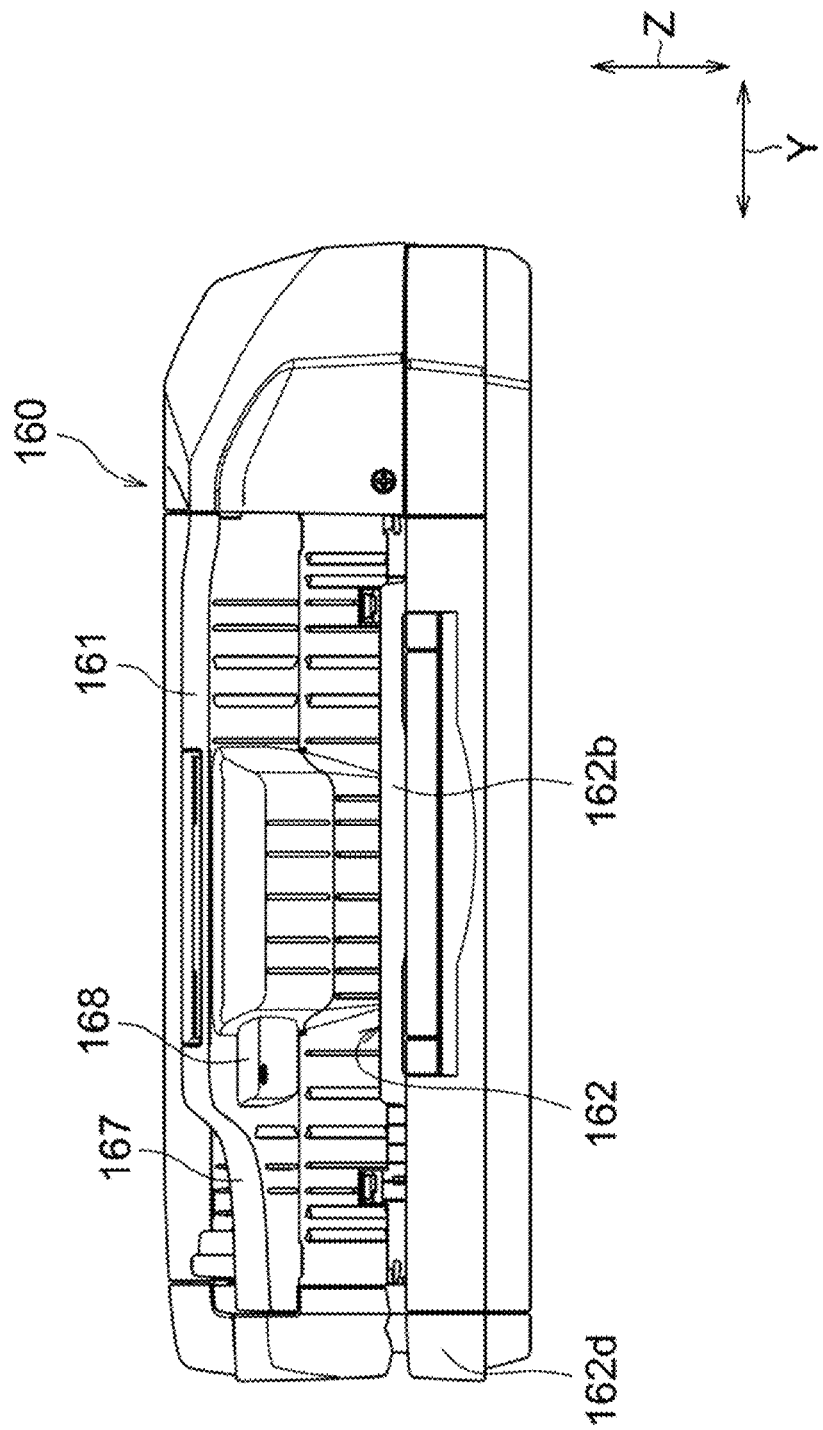
FIG. 8 is a side view of the document transport device illustrated in FIG. 1.
Figure 9:
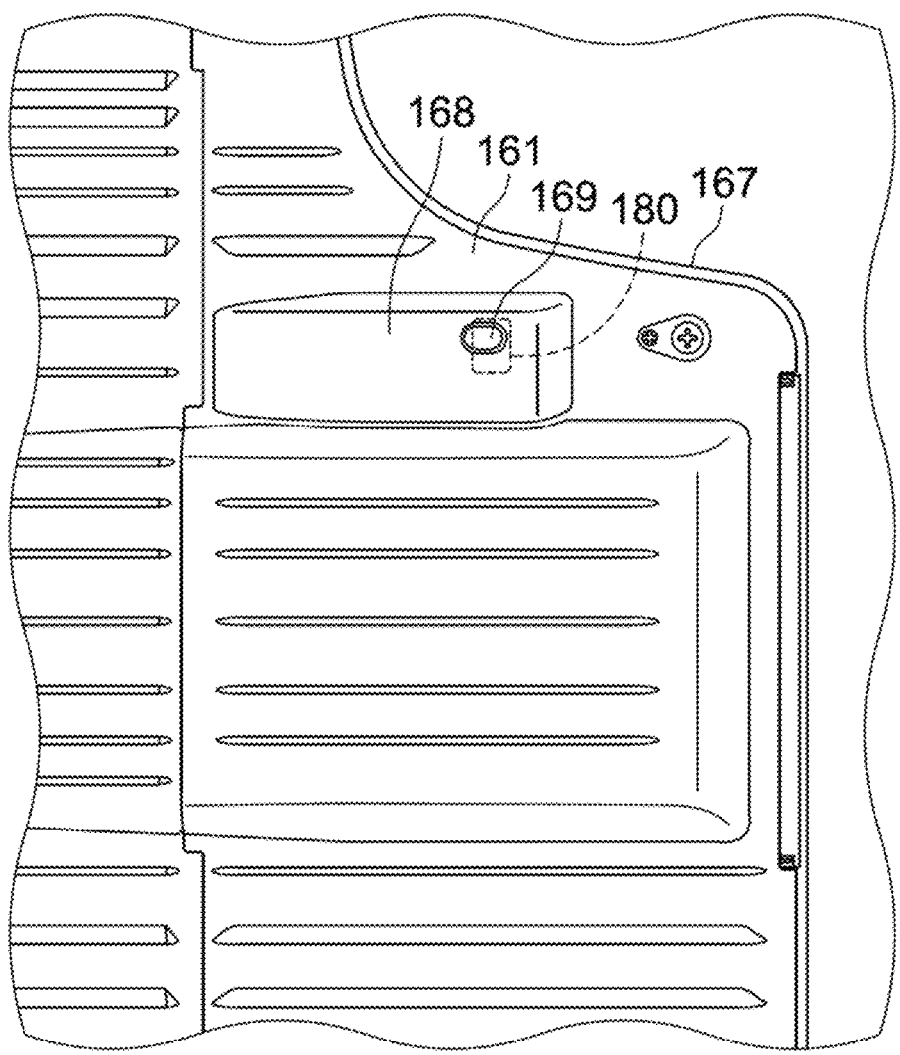
FIG. 9 is an enlarged bottom view illustrating the vicinity of a light source accommodator.
Figure 10:
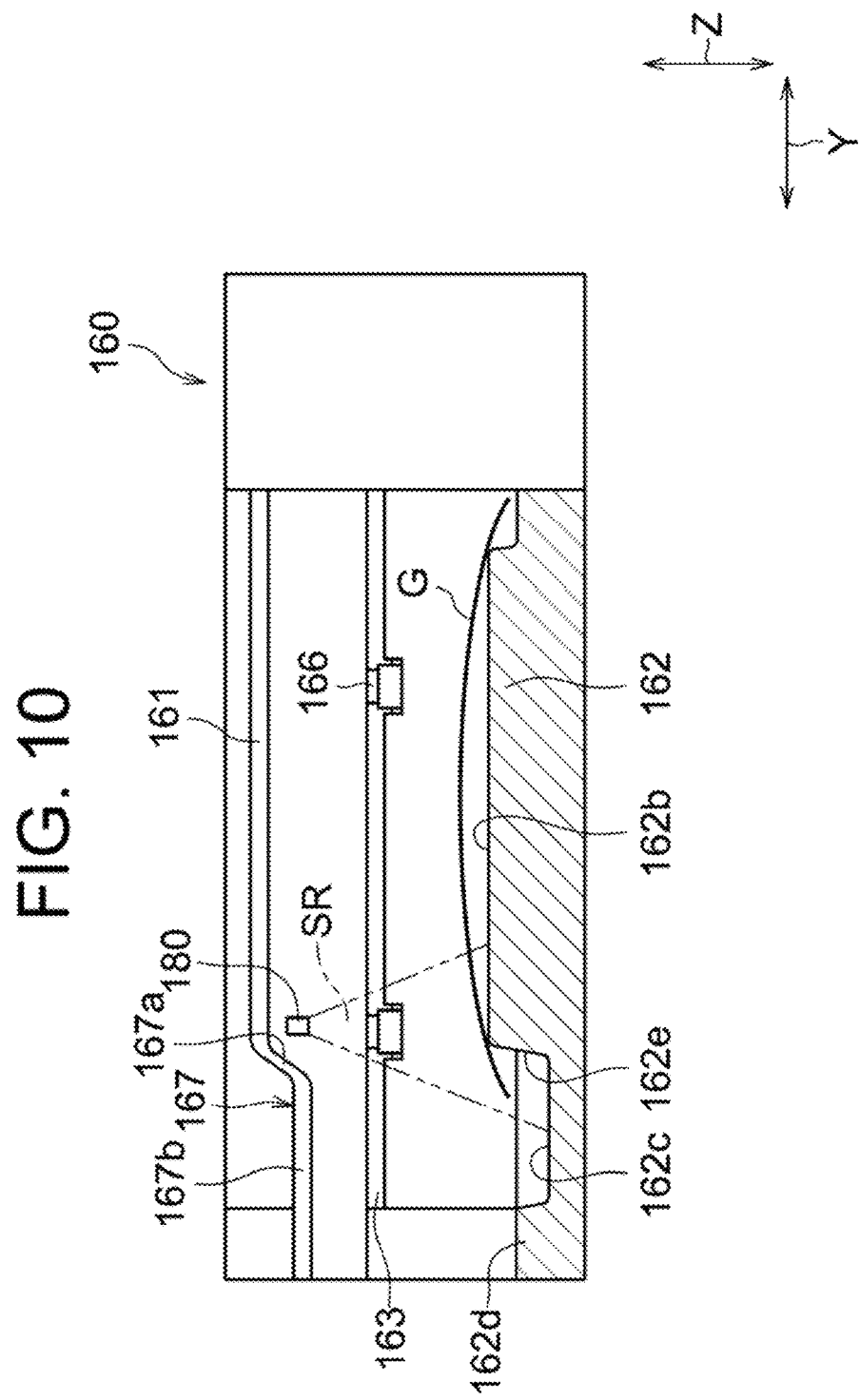
FIG. 10 is a schematic side view schematically illustrating a position of a light source with respect to a document discharge tray.

FIG. 5 is a perspective view illustrating the document transport device 160 illustrated in FIG. 1. FIG. 6 is a plan view of the document transport device 160 illustrated in FIG. 1. FIG. 7 is a front view of the document transport device 160 illustrated in FIG. 1. FIG. 8 is a side view of the document transport device 160 illustrated in FIG. 1. FIG. 9 is an enlarged bottom view illustrating the vicinity of a light source accommodator 168. Further, FIG. 10 is a schematic side view schematically illustrating a position of the light source 180 with respect to the document discharge tray 162.

The document discharge tray 162 stacks documents discharged from a document discharge port 163 along a discharge direction H. In the document transport device 160, in the lateral direction X along a front surface of the document transport device 160, a transporter 164 is provided on one end side (left side in FIG. 6), and the document set tray 161 and the document discharge tray 162 are provided on the other end side (right side in FIG. 6). The document set tray 161 and the document discharge tray 162 are provided side by side in the height direction Z. The document set tray 161 is arranged higher and the document discharge tray 162 is arranged lower. That is, the document set tray 161 is provided to extend from a document insertion port 165 provided in an upper part of the transporter 164 to the other end side. The document discharge tray 162 is provided to extend from the document discharge port 163 provided in a lower part of the transporter 164 to the other end side. Accordingly, a direction in which the document is inserted from the document set tray 161 (leftward in FIG. 6) is opposite to the discharge direction H of the document (rightward in FIG. 6) with respect to the document discharge tray 162.

In the document transport device 160, a document set on the document set tray 161 is taken into the transporter 164 via a document insertion port 165. Inside the transporter 164, the document read by the image reading device 102 is discharged from the transporter 164 via a document discharge roller 166 provided in the document discharge port 163 and stacked on the document discharge tray 162. In this example, a direction orthogonal to the discharge direction H is the width direction Y (up-down direction in FIG. 6).

The document set tray 161 is inclined so that an end part of the document set tray 161 on a side facing the document insertion port 165 is lower than an end part of the document set tray 161 on the opposite side of the document insertion port 165 (document set tray extended end 161a). That is, the document set tray 161 is provided with an inclination so that, if a document is set on the document set tray 161, the document slides and moves toward the document insertion port 165 due to the weight of the document.

The document discharge tray 162 is inclined substantially in the same manner as the document set tray 161, so that an end part of the document discharge tray 162 on the opposite side of the document discharge port 163 (document discharge tray extended end 162a) is higher. When the document is discharged from the document discharge port 163, the document discharge roller 166 imparts some momentum to the document in the discharge direction H. To prevent the document from falling from the document discharge tray 162 due to this momentum, the document is caused to slide and move toward the document discharge port 163, and the documents are aligned on the document discharge tray 162. It is noted that the document set tray 161 and the document discharge tray 162 may have the same or substantially the same inclination angle, or may have different inclination angles.

Further, a notch part 167 is provided in the document set tray 161 at a downstream side (right end in FIG. 6) in the discharge direction H, that is, at an end part on a near side (downward in FIG. 6) of the document transport device 160 in the width direction Y. The document set tray 161 and the document discharge tray 162 overlap in plan view (for example, FIG. 6), however, in a portion corresponding to the notch part 167, the document discharge tray 162 is exposed. It is noted that, in the following description, in the width direction Y, a front side of the document transport device 160 (the image forming apparatus 100) is referred to as a near side, and a rear side of the document transport device 160 is referred to as a back side (upper side in FIG. 6).

As illustrated in FIG. 6, the document set tray 161 is formed in a substantially rectangular shape in plan view, and the notch part 167 is provided in a portion corresponding to a corner of the document set tray 161. In an outer edge part of the document set tray 161 in the portion where the notch part 167 is provided, a lateral side comparably more along the lateral direction X is referred to as a first notch lateral side 167a, and a side comparably more along the width direction Y is referred to as a second notch lateral side 167b. That is, the first notch lateral side 167a is located closer to the back side (upper side in FIG. 6) than the side (lower side in FIG. 6) along the lateral direction X of the document set tray 161 and the second notch lateral side 167b is located closer to an upstream side (left side in FIG. 6) than the side (right side in FIG. 6) along the width direction Y of the document set tray 161. In FIG. 6, a range (notch region KR) in which the notch part 167 is provided in the discharge direction H is illustrated based on the first notch lateral side 167a and the second notch lateral side 167b.

In the image forming apparatus 100, it is usually assumed that a user stands on the front side and performs an operation, and thus, the operation device 120 (operation panel) or the like is provided on the front side. Further, a design is such that a hand can be easily inserted from the front side, when the user collects a document or a sheet.

The light source accommodator 168 that accommodates the light source 180 is provided in the vicinity of the notch part 167 on a lower surface of the document set tray 161. The light source accommodator 168 is an outer edge part of the document set tray 161 along the notch part 167 and is provided slightly closer to the back side than the notch part 167. A structure in the vicinity of the light source accommodator 168 will be described with reference to FIG. 9.

The document discharge tray 162 is inclined so that the side of the document discharge tray extended end 162a is higher, and an inclined surface is set based on this inclination. The document discharge tray 162 is provided with a convex part 162b and a concave part 162c so that the position of the document discharge tray 162 in the height direction Z is partially different from the inclined surface. It is noted that, the shape of the convex part 162b and the concave part 162c will be described in detail with reference to FIG. 10.

Further, the document discharge tray 162 includes a standing wall 162d provided along an outer edge of the document discharge tray 162. The height of a top surface of the standing wall 162d remains the same, and the standing wall 162d is a surface parallel to the lateral direction X and the width direction Y. That is, in the document discharge tray 162, a portion of the standing wall 162d is not inclined, but horizontal.

FIG. 9 is an enlarged view of the vicinity of the light source accommodator 168 provided at a position along the first notch lateral side 167a when the document set tray 161 is viewed from below. In the document set tray 161, the light source 180 is provided in a portion facing the light source accommodator 168. Further, the light source accommodator 168 is provided with an opening 169 that opens a chassis on a lower surface side of the document set tray 161, and a part of the light source 180 is exposed via the opening 169. The light source 180 includes, for example, a light-emitting element such as an LED, and light irradiated from the light source 180 is emitted from the opening 169. The notch part 167 of the document set tray 161 is provided to make it easier for the user to insert a hand between the document set tray 161 and the document discharge tray 162, and is easily noticed by the user when the user takes out the document. Therefore, when the light source 180 is arranged in the vicinity of the notch part 167, the light source 180 easily enters a field of view of the user and the user easily finds an irradiation of light.

FIG. 10 schematically illustrates the document transport device 160 as viewed from a side surface on a side where the document discharge tray extended end 162a is provided. It is noted that only the document discharge tray 162 is hatched to indicate a cross section at a portion facing the light source 180 to emphasize unevenness. Further, for the sake of clarity of the drawing, FIG. 10 illustrates one document G stacked on the document discharge tray 162. However, this is not limiting and a plurality of documents G may be stacked on the document discharge tray 162. Moreover, the document G illustrated in FIG. 10 indicates a document G having the maximum length in the width direction Y among the documents G transported by the document transport device 160.

Substantially in the center of the document discharge tray 162 in the width direction Y, the convex part 162b that protrudes upward from the surroundings of the convex part 162b is provided, and the concave part 162c is provided adjacent to a near side (left in FIG. 10) of the convex part 162b. The standing wall 162d is provided at a near side end part at an outer edge of the document transport device 160. That is, the concave part 162c exists in a portion between the standing wall 162d and the convex part 162b. In the cross section illustrated in FIG. 10, in the height direction Z, the convex part 162b is the highest, the standing wall 162d is the second highest, and the concave part 162c is the lowest.

In the present embodiment, the convex part 162b is provided in a wide portion of the document discharge tray 162 in the width direction Y, and projects in a trapezoidal shape in side view. In the cross section illustrated in FIG. 10, the height of the convex part 162b remains substantially the same at the top, and a steep level difference is provided at the end part of the convex part 162b in the width direction Y. At a boundary between the convex part 162b and the concave part 162c that are adjacent to each other, the height difference between the convex part 162b and the concave part 162c is combined to form an even larger level difference, and a wall part 162e rising in the height direction Z is provided. It is noted that, it is sufficient that the wall part 162e forms an inclination that makes the boundary with respect to a top surface of the convex part 162b clear, and the wall part 162e does not need to be perfectly vertical. Further, the shape of the wall part 162e may be rounded to prevent the document G from being caught at an upper end and a lower end of the wall part 162e.

The convex part 162b is located slightly closer to the back side than the approximate center of the document discharge tray 162 in the width direction Y, and the length of the convex part 162b in the width direction Y is shorter than the maximum size of the document. A large portion of the document G on the document discharge tray 162 overlaps the convex part 162b in the width direction Y, and an end part of the document G slightly protrudes outside the convex part 162b. The portion of the document G that protrudes to the near side from the convex part 162b is located above the wall part 162e and the concave part 162c and due to the height difference with the convex part 162b, the document G hangs down and is curved in a peak shape.

In the notch part 167, the first notch lateral side 167a is provided at substantially the same position as the wall part 162e in the width direction Y. The light source 180 is provided in the vicinity of the first notch lateral side 167a and emits light toward the document discharge tray 162 (downward). A two-dot chain line in FIG. 10 indicates a range (irradiation range SR) in which light from the light source 180 is irradiated, and in the width direction Y, a vicinity of the boundary between the convex part 162b and the concave part 162c is included in the irradiation range SR. It is noted that, the irradiation range SR may be set appropriately with respect to the discharge direction H, and it is preferable that the irradiation range SR is set to include both the stacked document G and the document discharge tray 162.

Control Example Related to Notification about Forgetting to Take Document

Next, a notification about forgetting to take a document will be described. An example of a notifier that notifies that a document is forgotten to take includes an aspect in which the notification about forgetting to take the document is performed by any one or a combination of at least two of illuminating a light source, an alarm sound, and a voice. In this example, notification about forgetting to take the document G is performed by illuminating the light source 180.

However, during the notification about forgetting to take the document, if the light source 180 is illuminated until the user removes the document, the light source 180 remains illuminated unless the user removes the document, thus resulting in an excessive warning. In this regard, in the present embodiment, when notifying the user of forgetting to take the document, the controller 170 turns the light source 180 off after a predetermined time has elapsed since the light source 180 was turned on. For example, the controller 170 makes the light source 180 to illuminate in a predetermined illuminating pattern. Examples of the predetermined illuminating pattern include an illuminating pattern in which blinking (for example, illuminating for two seconds, illuminating off for two seconds) is repeated a plurality of times (for example, three times) within a predetermined time (for example, 12 seconds). This can avoid an excessive warning in which the light source 180 is illuminated unless the user removes the document G.

The image reading device 102 further includes a document setting detector 191 and a document discharge detector 192. The document setting detector 191 detects the presence or absence of a document set on the document set tray 161. The document discharge detector 192 detects whether or not the document is discharged to the document discharge tray 162, that is, the presence or absence of the document discharged to the document discharge tray 162. The document setting detector 191 and the document discharge detector 192 are electrically connected to an input system of the controller 170. The document setting detector 191 transmits, to the controller 170, a signal indicating whether or not a document is set on the document set tray 161. As a result, the controller 170 can recognize (detect) whether or not a document is set on the document set tray 161. Further, the document discharge detector 192 transmits, to the controller 170, a signal indicating whether or not the document is discharged to the document discharge tray 162. As a result, the controller 170 can recognize (detect) whether or not the document is discharged to the document discharge tray 162. Conventionally known detectors can be used as the document setting detector 191 and the document discharge detector 192 and typical examples include a light-reflective sensor that detects light from the document, and a light-transmissive sensor including an actuator that turns on and off depending on the presence or absence of a document.

However, in the image reading device 102, the maximum number of documents to be set on the document set tray 161

(predetermined permissible document number) is determined in advance, and no more documents than the maximum number of documents can be set on the document set tray 161, and thus, without a large-quantity-document reading function, the documents cannot be read if the maximum number of documents is exceeded during one job. In this regard, the image reading device 102 further includes a large-quantity-document reading function. The large-quantity-document reading function is a function that reads a plurality of documents in a plurality of reading operations during one job. As a result, a document can be read even if the maximum number of documents is exceeded during one job. Further, the image reading device 102 further includes the display 122 and a preview function. The preview function is a function that displays, on the display 122 prior to execution of a job, an image (thumbnail image) corresponding to image data obtained by reading the document. The controller 170 executes the large-quantity-document reading function and the preview function by selectively receiving a user operation through the operation processor 103.

FIGS. 11 to 15 are flowcharts illustrating an example of a control operation of the notification about forgetting to take a document. It is noted that, in the following flowcharts, when reading the document, the controller 170 displays, on the display 122, a message such as "Depress 'Cancel Key' to stop reading document", and displays the cancel key 122b on the display 122 to allow for an input operation.

Main Routine

Figure 11:
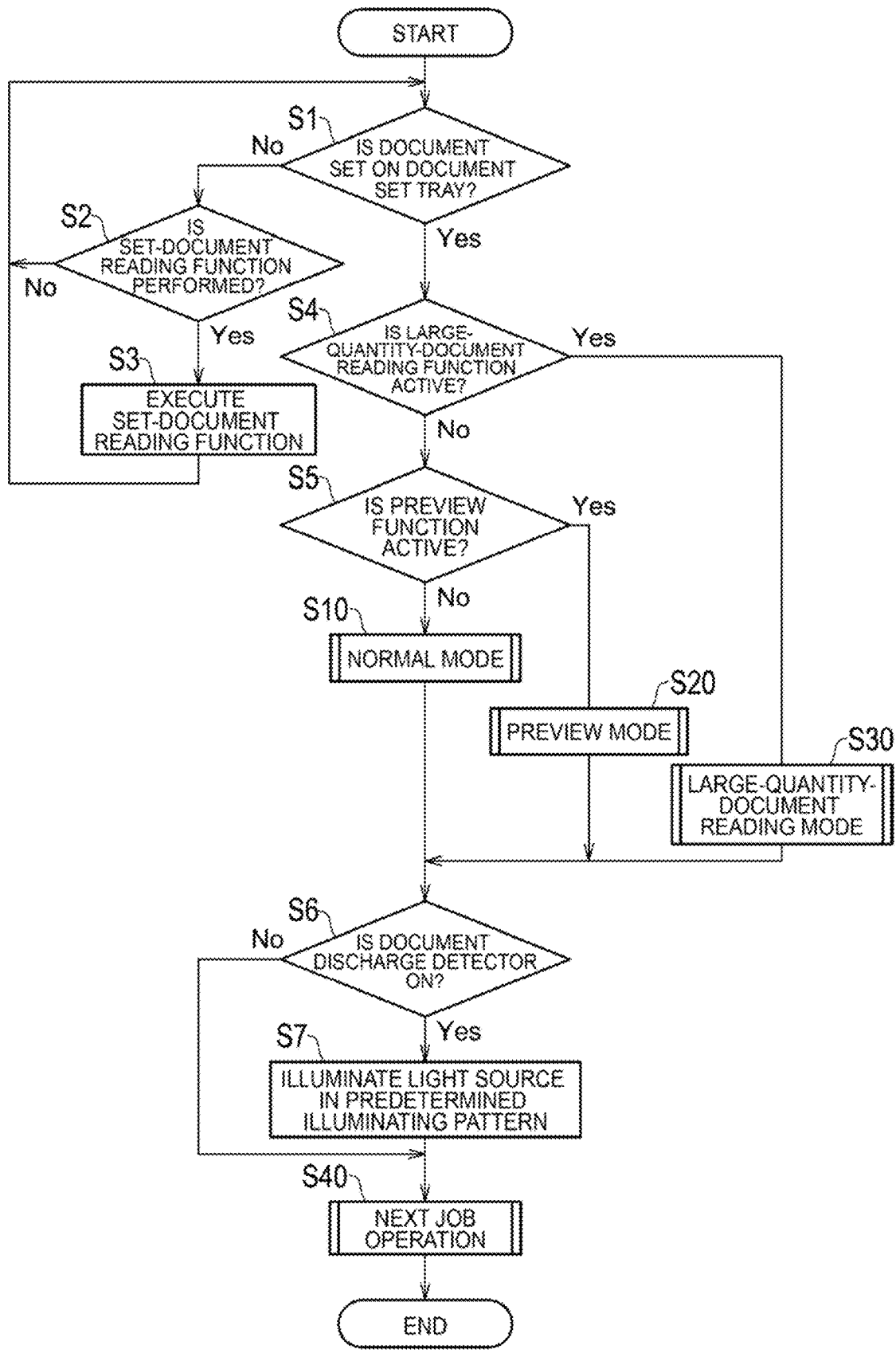
FIG. 11 is a flowchart illustrating a main routine in a control operation of a notification of forgetting to take a document.

FIG. 11 is a flowchart illustrating a main routine in the control operation of the notification about forgetting to take a document. As illustrated in FIG. 11, in the main routine, first, the controller 170 determines whether or not a document is set on the document set tray 161 by the document setting detector 191 (S1), and if the document is not set on the document set tray 161 (S1: No), the controller 170 waits until a set-document reading function is performed (S2: No). If the user sets a document on the document platen 130a and depresses (turns on) the job execution key 122a (so-called start key), the controller 170 executes the set-document reading function (S3) and proceeds to S1.

On the other hand, if the document is set on the document set tray 161 (S1: Yes), the controller 170 determines whether or not the large-quantity-document reading function is active (S4), and if the large-quantity-document reading function is not active (S4: No), the controller 170 determines whether or not the preview function is active (S5). Next, if the preview function is not active (S5: No), the controller 170 executes a subroutine in a normal mode (S10), and proceeds to S6. Further, if the preview function is active (S5: Yes), the controller 170 executes a subroutine in a preview mode (S20), and proceeds to S6. On the other hand, if the large-quantity-document reading function is active (S4: Yes), the controller 170 executes a subroutine in a large-quantity-document reading mode (S30), and proceeds to S6.

Next, the controller 170 determines whether or not the document is discharged to the document discharge tray 162 to turn on the document discharge detector 192 (S6), and if the document discharge detector 192 is on (S6: Yes), the controller 170 illuminates the light source 180 in the predetermined illuminating pattern (S7), executes a subroutine in a next job operation (S40), and ends the process. On the other hand, if the document discharge detector 192 is off (S6: No), the controller 170 executes the subroutine in the next job operation without illuminating the light source 180 in the predetermined illuminating pattern (S40) and ends the process.

Subroutine in Normal Mode

Figure 12:
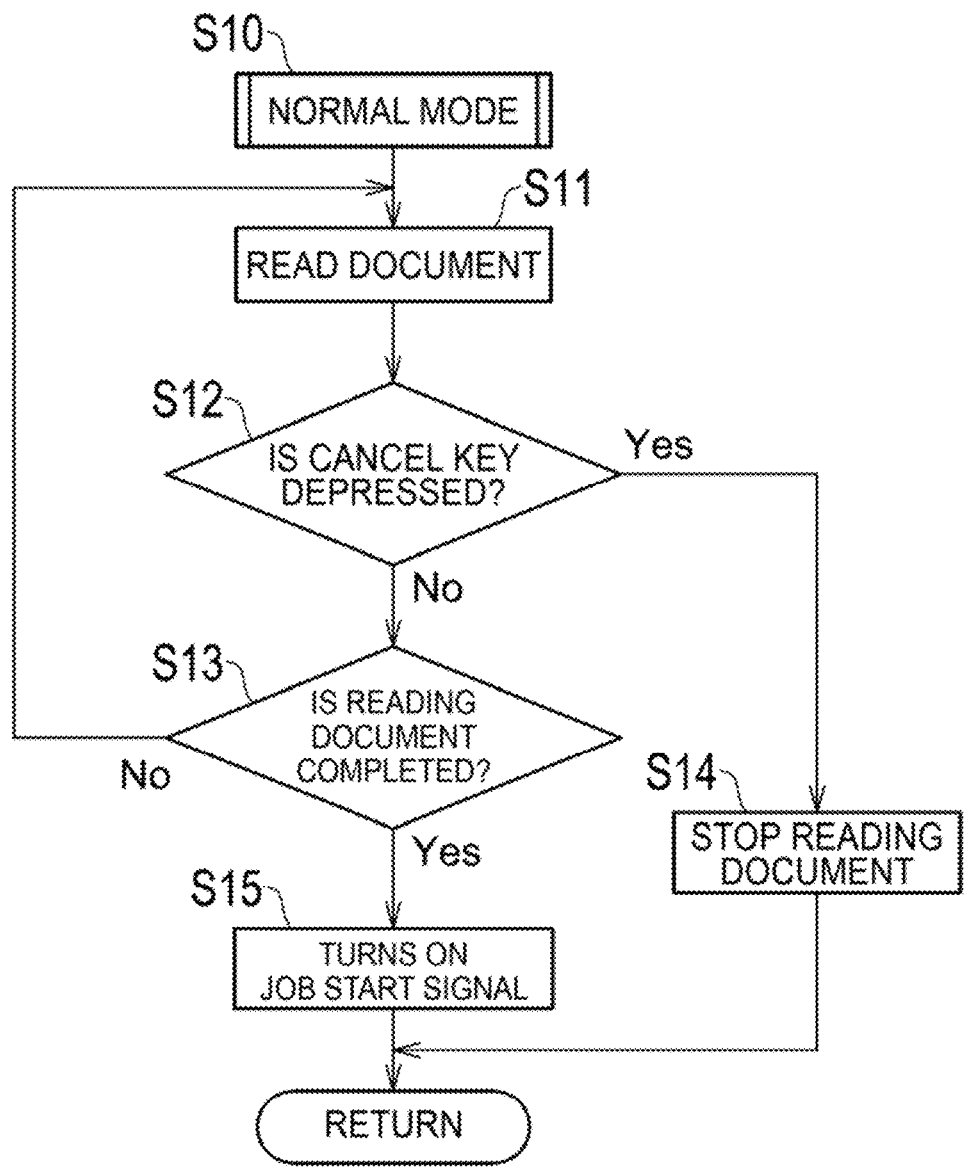
FIG. 12 is a flowchart illustrating a subroutine in a normal mode.

FIG. 12 is a flowchart illustrating the subroutine in the normal mode. As illustrated in FIG. 12, in the subroutine in the normal mode, first, the controller 170 starts reading a document (S11), and at this time, if the cancel key 122b is not depressed (turned on) by the user (S12: No), the processes of S11 to S13 are performed until reading of the document is completed (S13: No), however, if the cancel key 122b is depressed (S12: Yes), reading of the document is stopped (S14) and the controller 170 returns to S6 illustrated in FIG. 11. On the other hand, if reading of the document is completed (S13: Yes), the controller 170 turns on a job start signal to start a job (S15), and returns to S6 illustrated in FIG. 11.

Subroutine in Preview Mode

Figure 13:
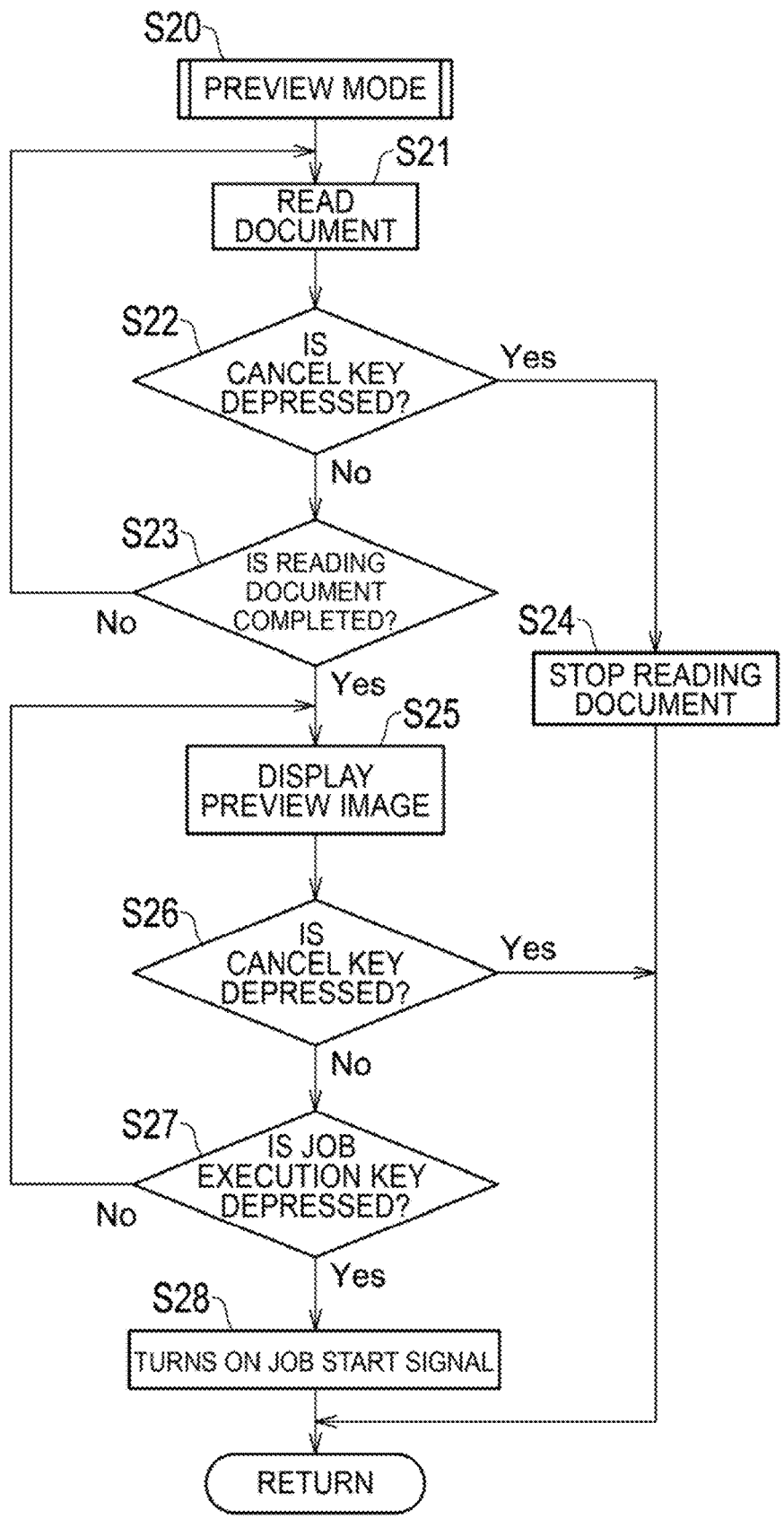
FIG. 13 is a flowchart illustrating a subroutine in a preview mode.

FIG. 13 is a flowchart illustrating the subroutine in the preview mode. As illustrated in FIG. 13, in the subroutine in the preview mode, first, the controller 170 starts reading a document (S21), and at this time, if the cancel key 122b is not depressed by the user (S22: No), the processes of S21 to S23 are performed until reading of the document is completed (S23: No), however, if the cancel key 122b is depressed (S22: Yes), reading of the document is stopped (S24) and the controller 170 returns to S6 illustrated in FIG. 11. The process up to this point is similar to that in the normal mode. On the other hand, if reading of the document is completed (S23: Yes), the controller 170 displays a preview image (S25), and if the cancel key 122b is not depressed by the user (S26: No), the processes of S25 to S27 are performed, until the job execution key 122a is depressed by the user (S27: No), and if the cancel key 122b is depressed (S26: Yes), the controller 170 returns to S6 illustrated in FIG. 11. On the other hand, if the job execution key 122a is depressed (S27: Yes), the controller 170 turns on the job start signal (S28), and returns to S6 illustrated in FIG. 11.

Subroutine in Large-Quantity-Document Reading Mode

Figure 14:
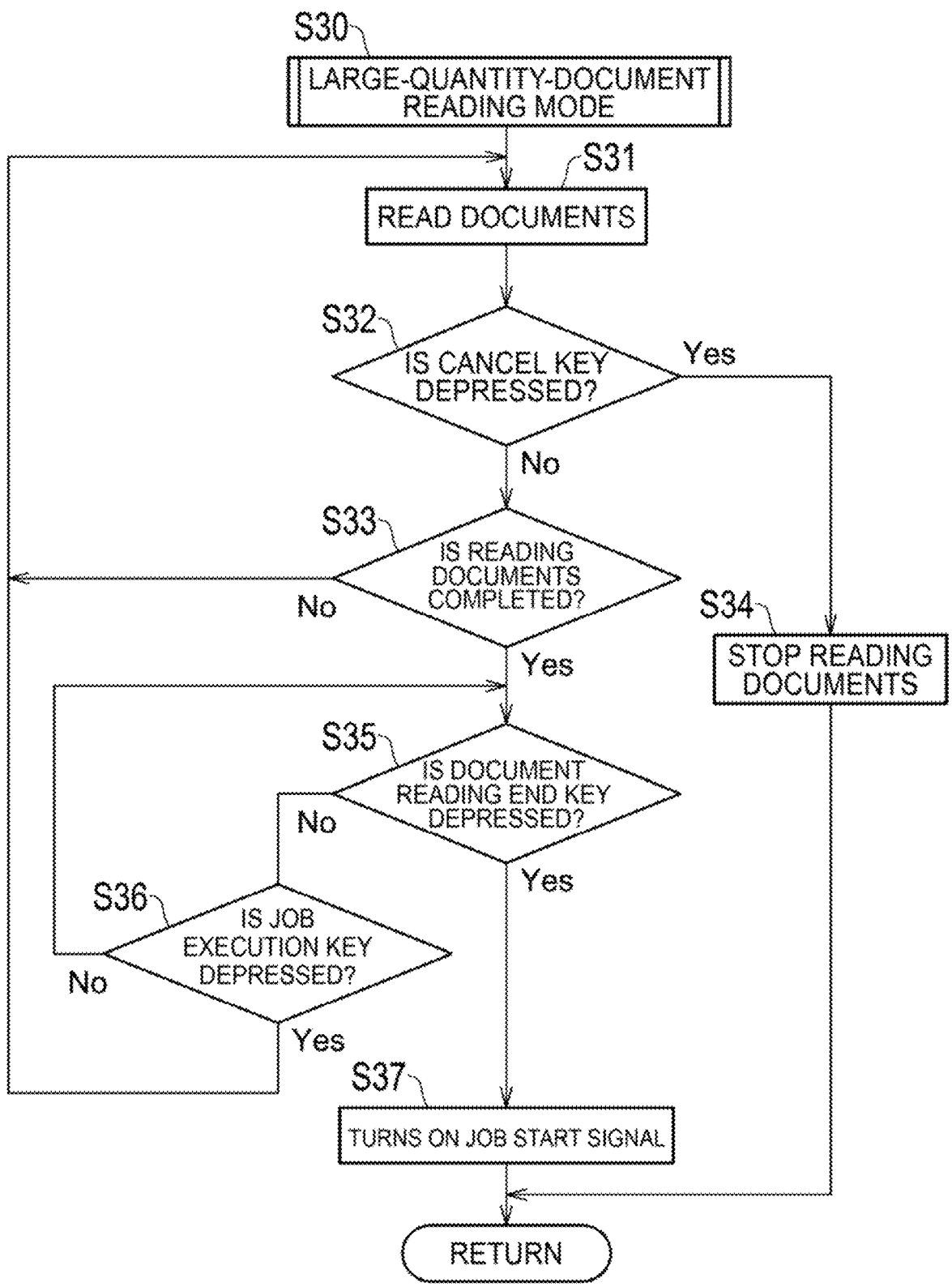
FIG. 14 is a flowchart illustrating a subroutine in a large-quantity-document reading mode.

FIG. 14 is a flowchart illustrating the subroutine in the large-quantity-document reading mode. As illustrated in FIG. 14, in the subroutine in the large-quantity-document reading mode, first, the controller 170 starts reading a document (S31), and at this time, if the cancel key 122b is not depressed by the user (S32: No), the processes of S31 to S33 are performed until reading of the document is completed (S33: No), however, if the cancel key 122b is depressed (S32: Yes), reading of the document is stopped (S34) and the controller 170 returns to S6 illustrated in FIG. 11. The process up to this point is similar to that in the normal mode. On the other hand, if reading of the document is completed (S33: Yes), the controller 170 performs the processes of S35 and S36 until the user depresses (turns on) the document reading end key 122c (S35: No), or until the user depresses the job execution key 122a (S36: No). At this time, the controller 170 displays, on the display 122, a message such as "Depress 'Job Execution Key' to continue reading documents, Depress 'Document Reading End Key' to end reading", and displays, on the display 122, the job execution key 122a and the document reading end key 122c to allow for an input operation. If the job execution key 122a is depressed (S36: Yes), the controller 170 proceeds to S31. On the other hand, if the document reading end key 122c is depressed (S35: Yes), the controller 170 turns on the job start signal (S37) and returns to S6 illustrated in FIG. 11.

Subroutine in Next Job Operation

Figure 15:
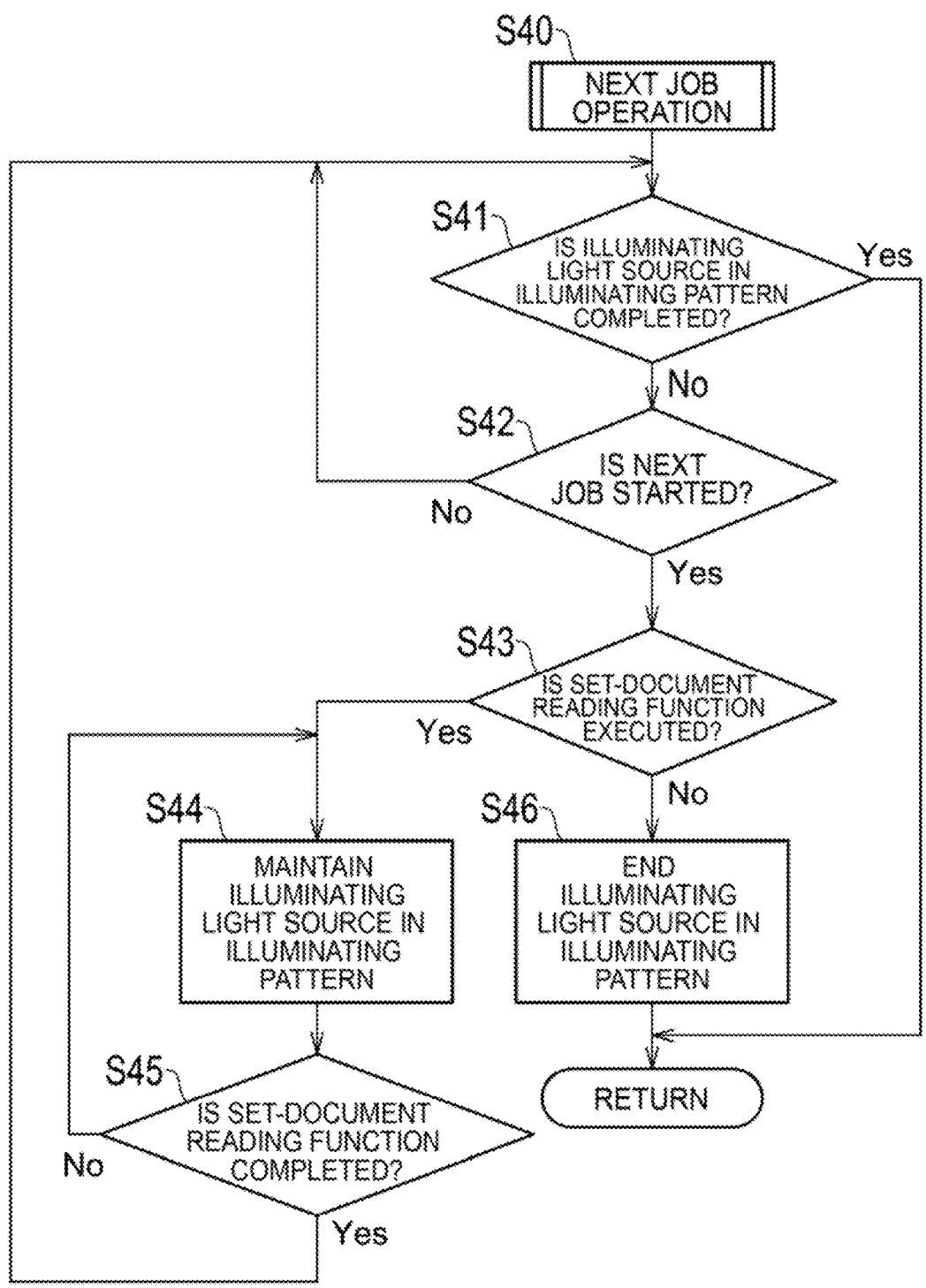
FIG. 15 is a flowchart illustrating a subroutine in a next job operation.

FIG. 15 is a flowchart illustrating the subroutine in the next job operation. As illustrated in FIG. 15, in the subroutine in the next job operation, first, if illuminating the light source 180 in the illuminating pattern is completed (S41: Yes), the controller 170 returns to S6 illustrated in FIG. 11, and if the next job starts (S42: Yes) when the illuminating pattern of the light source 180 is not completed (S41: No, S42: No), the controller 170 determines whether or not the set-document reading function (reading of the document set on the document platen 130a) is executed (whether or not the job execution key 122a of the set-document reading function is depressed) (S43). Next, if the set-document reading function is executed (S43: Yes), the controller 170 maintains illuminating the light source 180 in the illuminating pattern (S44, S45: No) until the set-document reading function is completed (S45: No), and if the set-document reading function is completed (S45: Yes), the controller 170 proceeds to S41. On the other hand, if the set-document reading function is not executed (S43: No), the controller 170 ends illuminating the light source 180 in the illuminating pattern (S46), and returns to S6 illustrated in FIG. 11.

First Embodiment

In a first embodiment, if executing the large-quantity-document reading function, the controller 170 determines that the last document that is read last in the last reading operation among a plurality of reading operations, is read. In this way, even if the large-quantity-document reading function is executed, it is possible to notify (to inform by illuminating the light source 180) the user, by the notifier (light source 180), of forgetting to take a document in a state where it is surely recognized whether or not the last document is read.

Second Embodiment

In a second embodiment, the controller 170 determines that the last document is read and if the document discharge detector 192 detects that the document is discharged to the document discharge tray 162, the controller 170 activates (illuminates) the notifier (light source 180). In this way, it is possible to notify the user of forgetting to take a document discharged to the document discharge tray 162 in a state where it is surely recognized whether or not the last document is read.

Third Embodiment

In a third embodiment, if the controller 170 executes the preview function, the controller 170 activates (illuminates) the notifier (light source 180) when an execution key for a job is turned on. In this way, even if the preview function is executed, it is possible to notify the user of forgetting to take a document.

Fourth Embodiment

In a fourth embodiment, the controller 170 activates (illuminates) the notifier (light source 180) if the cancel key 122b is turned on during reading of the document. In this way, even if the cancel key 122b is turned on during reading of the document, it is possible to notify the user of forgetting to take a document.

Fifth Embodiment

In a fifth embodiment, after the job is completed, if the next job is started while the notifier (light source 180) is activated (illuminated), the controller 170 ends the activation (illumination) of the notifier (light source 180). In this way, when the next job is started, notifying the user of forgetting to take a document in the current job can be ended, and in this state, it is possible to notify a user of forgetting to take a document in the next job.

Sixth Embodiment

In a sixth embodiment, after the job is completed, if the set-document reading function is executed while the notifier (light source 180) is activated (illuminated), the controller 170 maintains the activation (illumination) of the notifier (light source 180). In this way, during the execution of the set-document reading function, it is possible to maintain the activation (illumination) of the notifier (light source 180) that notifies the user of forgetting to take a document in a transported-document reading function that reads the plurality of documents transported by the document transport device 160. As a result, even if the set-document reading function is executed after the transported-document reading function, it is possible, in the transported-document reading function, to notify the user of forgetting to take the document.

The present invention is not limited to the embodiments described above, and can be implemented in various other forms. Therefore, the embodiments are merely an example in all respects and should not be interpreted in a limiting manner. The scope of the present invention is indicated by the claims, and is not restricted by the description of the specification. Further, all modifications and changes belonging to a scope equivalent to the claims are included within the scope of the present invention.

DESCRIPTION OF REFERENCE NUMERALS

100 Image forming apparatus
101 Image forming apparatus main body
102 Image reading device
103 Operation processor
110 Image former
120 Operation device
122 Display
122a Job execution key
122b Cancel key
122c Document reading end key
130 Image reader
130a Document platen
130b Document reader
130c Scanning optical system
160 Document transport device
161 Document set tray
162 Document discharge tray
170 Controller
171 Processor
171a Determiner
172 Storage
180 Light source
191 Document setting detector
192 Document discharge detector
G Document
H Discharge direction
SR Irradiation range
X Lateral direction
Y Width direction
Z Height direction

What is claimed is:

1. An image reading device comprising a document transport device that sequentially transports a plurality of documents one by one, the image reading device sequentially reading the plurality of documents transported by the document transport device one by one, the image reading device comprising:
    a document discharge tray,
    a document discharge detector that detects whether or not a document of the plurality of documents is discharged to the document discharge tray;
    a notifier that notifies that the document of the plurality of documents discharged to the document discharge tray is forgotten to take; and
    a controller that activates the notifier if it is determined that a last document among the plurality of documents is read and the document discharge detector detects that the document of the plurality of documents is discharged to the document discharge tray, wherein
    after a job is completed, if a next job is started while the notifier is activated, the controller ends the activation of the notifier.

2. The image reading device according to claim 1, further comprising:
    a large-quantity-document reading function that reads the plurality of documents in a plurality of reading operations during one job, wherein
    if executing the large-quantity-document reading function, the controller determines that a last document that is read last in a last reading operation among the plurality of reading operations, is read.

3. The image reading device according to claim 1, wherein
    the controller determines that the last document among the plurality of documents is read.

4. The image reading device according to claim 1, further comprising:
    a display; and
    a preview function that displays, on the display prior to execution of a job, an image corresponding to image data obtained by reading a document of the plurality of documents, wherein
    if executing the preview function, the controller activates the notifier when an execution key for the job is turned on.

5. The image reading device according to claim 1, wherein
    the controller activates the notifier when a cancel key is turned on during reading of a document of the plurality of documents.

6. The image reading device according to claim 1, further comprising:
    a document platen on which a document of the plurality of documents is set; and
    a set-document reading function that reads a document set on the document platen, wherein
    after the job is completed, if the controller executes the set-document reading function while the notifier is activated, the controller maintains the activation of the notifier.

7. An image forming apparatus comprising the image reading device according to claim 1.

8. An image reading device comprising a document transport device that sequentially transports a plurality of documents one by one, the image reading device sequentially reading the plurality of documents transported by the document transport device one by one, the image reading device comprising:
    a document discharge tray;
    a document discharge detector that detects whether or not a document of the plurality of documents is discharged to the document discharge tray;
    a notifier that notifies that the document of the plurality of documents discharged to the document discharge tray is forgotten to take;
    a controller that activates the notifier if it is determined that a last document among the plurality of documents is read and the document discharge detector detects that the document of the plurality of documents is discharged to the document discharge tray;
    a document platen on which a document of the plurality of documents is set; and
    a set-document reading function that reads a document set on the document platen, wherein
    after a job is completed, if the controller executes the set-document reading function while the notifier is activated, the controller maintains the activation of the notifier.

9. The image reading device according to claim 8, further comprising:
    a large-quantity-document reading function that reads the plurality of documents in a plurality of reading operations during one job, wherein
    if executing the large-quantity-document reading function, the controller determines that a last document that is read last in a last reading operation among the plurality of reading operations, is read.

10. The image reading device according to claim 8, wherein
    the controller determines that the last document among the plurality of documents is read.

11. The image reading device according to claim 8, further comprising:
    a display; and
    a preview function that displays, on the display prior to execution of a job, an image corresponding to image data obtained by reading a document of the plurality of documents, wherein
    if executing the preview function, the controller activates the notifier when an execution key for the job is turned on.

12. The image reading device according to claim 8, wherein
    the controller activates the notifier when a cancel key is turned on during reading of a document of the plurality of documents.

13. An image forming apparatus comprising the image reading device according to claim 8.

* * * * *